(12) United States Patent
Mishra et al.

(10) Patent No.: US 12,236,109 B2
(45) Date of Patent: Feb. 25, 2025

(54) EPHEMERAL DATA MANAGEMENT FOR CLOUD COMPUTING SYSTEMS USING COMPUTATIONAL FABRIC ATTACHED MEMORY

(71) Applicant: Advanced Micro Devices, Inc., Santa Clara, CA (US)

(72) Inventors: Pratik Mishra, Santa Clara, CA (US); Sergey Blagodurov, Bellevue, WA (US); Atul Kumar Sujayendra Sandur, Santa Clara, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 119 days.

(21) Appl. No.: 18/201,696

(22) Filed: May 24, 2023

(65) Prior Publication Data

US 2024/0393956 A1 Nov. 28, 2024

(51) Int. Cl.
*G06F 3/06* (2006.01)
*G06F 9/48* (2006.01)
*G06F 9/50* (2006.01)

(52) U.S. Cl.
CPC .......... *G06F 3/0619* (2013.01); *G06F 3/0659* (2013.01); *G06F 3/067* (2013.01); *G06F 9/4881* (2013.01); *G06F 9/5027* (2013.01); *G06F 9/5066* (2013.01)

(58) Field of Classification Search
None
See application file for complete search history.

(56) References Cited

U.S. PATENT DOCUMENTS

| | | | | |
|---|---|---|---|---|
| 10,671,440 | B2* | 6/2020 | LaBute | G06F 9/5061 |
| 11,030,016 | B2* | 6/2021 | Banerjee | G06F 9/5072 |
| 11,561,826 | B1* | 1/2023 | Nagpal | G06N 3/063 |
| 11,714,686 | B2* | 8/2023 | Bianchini | G06F 9/5072 718/1 |
| 2020/0285508 | A1* | 9/2020 | Lu | G06F 9/5005 |
| 2021/0333998 | A1* | 10/2021 | Yamamoto | G06F 3/0604 |
| 2022/0253335 | A1* | 8/2022 | Bequet | G06N 3/084 |

(Continued)

OTHER PUBLICATIONS

Hu et al. (Scheduling Periodic Task Graphs for Safety-Critical Time-Triggered Avionic Systems). pp. 2294-2304; IEEE Transactions on Aerospace and Electronic Systems. (Year: 2015).*

(Continued)

*Primary Examiner* — Kaushikkumar M Patel
(74) *Attorney, Agent, or Firm* — Patterson + Sheridan, LLP

(57) ABSTRACT

A cloud computing system includes cloud orchestrator circuitry and fabric manager circuitry. The cloud orchestrator circuitry receives an input application and determines a task graph, a data graph, and a function popularity heap parameter for the input application. The task graph comprises an indication of function interdependency of functions of the input application, the data graph comprises an indication of data interdependency of the functions, and the function popularity heap parameter corresponds to a re-usability index for the functions. The fabric manager circuitry allocate a first programmable integrated circuit (IC) device to perform a first function of the input application based on the task graph, the data graph, and the function popularity heap parameter.

20 Claims, 11 Drawing Sheets

(56) References Cited

U.S. PATENT DOCUMENTS

| | | | |
|---|---|---|---|
| 2023/0100163 A1* | 3/2023 | Adams | G06F 9/4893 |
| | | | 718/103 |
| 2023/0376735 A1* | 11/2023 | Rainone | G06N 3/0455 |
| 2024/0086246 A1* | 3/2024 | Doiron | G06F 9/5072 |

OTHER PUBLICATIONS

Roy et al. (SAFLA: Scheduling Multiple Real-Time Periodic Task Graphs on Heterogeneous Systems). pp. 1067-1080; IEEE xplore. Jun. 2022 (Year: 2022).*
Jonas, Eric, et al. "Cloud programming simplified: A berkeley view on serverless computing." arXiv preprint arXiv:1902.03383 (2019).
Wawrzoniak, Mike, et al. "Boxer: Data Analytics on Network-enabled Serverless Platforms." 11th Annual Conference on Innovative Data Systems Research (CIDR 2021). 2021.
Mishra, P., Somani, A.K. (2020). LDM: Lineage-Aware Data Management in Multi-tier Storage Systems. In: Arai, K., Bhatia, R. (eds) Advances in Information and Communication. FICC 2019. Lecture Notes in Networks and Systems, vol. 69. Springer, Cham.
Mahgoub, Ashraf, et al. "{Sonic}: Application-aware Data Passing for Chained Serverless Applications." 2021 USENIX Annual Technical Conference (USENIX ATC 21). 2021.
IBM Open FAM API : https://openfam.github.io/.
Wang, Zheng, et al. "Integrating profile-driven parallelism detection and machine-learning-based mapping." ACM Transactions on Architecture and Code Optimization (TACO) 11.1 (2014): 1-26.

* cited by examiner

EPHEMERAL DATA MANAGEMENT FOR CLOUD COMPUTING SYSTEMS USING COMPUTATIONAL FABRIC ATTACHED MEMORY

TECHNICAL FIELD

Examples of the present disclosure generally relate to managing ephemeral data in a cloud computing system using a fabric attached memory to reduce read and write memory operations within remote storage devices.

BACKGROUND

Cloud computing systems receive and perform cloud-native applications within the computing resources of the cloud computing system. A cloud computing system commonly includes processing units (central processing units and/or graphics processing units, among others), remote storage devices, and cloud management devices. During execution, the cloud-native applications store a large amount of ephemeral (e.g., short-lived) intermediate data in the remote storage devices. The ephemeral intermediate data is produced and consumed by daisy-chained compute tasks of the cloud native-applications. The compute tasks are provisioned to the processing units. The processing units obtain data from the remove storage devices and store data within the remote storage devices while completing the tasks. The tasks include interdependent (e.g., lineage) tasks, where a task uses the data generated by a previous task. The processing units executing the tasks perform many read and write data operations to the remote storage devices via the network and input/output stacks of the cloud computing systems. The large number of read and write data operations increases the data processing complexity and processing errors that may occur.

SUMMARY

In one example, a cloud computing system includes cloud orchestrator circuitry and fabric manager circuitry. The cloud orchestrator circuitry receives an input application and determines a task graph, a data graph, and a function popularity heap parameter for the input application. The task graph comprises an indication of function interdependency of functions of the input application, the data graph comprises an indication of data interdependency of the functions, and the function popularity heap parameter corresponds to a re-usability index for the functions. The fabric manager circuitry allocate a first programmable integrated circuit (IC) device to perform a first function of the input application based on the task graph, the data graph, and the function popularity heap parameter.

In one example, a method includes determining a task graph, a data graph, and a function popularity heap parameter for an input application. The task graph comprises an indication of function interdependency of functions of the input application, the data graph comprises an indication of data interdependency of the functions, and the function popularity heap parameter corresponds to a re-usability index for the function. Further, the method includes allocating a first programmable IC device to perform a first function of the input application based on the task graph, the data graph, and the function popularity heap parameter.

In one example, a cloud computing system includes fabric manager circuitry and fabric attached memory circuitry (FAM). The fabric manager circuitry allocates a first programmable IC device to perform a first function of an input application based on a task graph, a data graph, and a function popularity heap parameter of the input application. The task graph comprises an indication of function interdependency of functions of the input application, the data graph comprises an indication of data interdependency of the functions, and the function popularity heap parameter corresponds to a re-usability index for the functions. The FAM circuitry allocates a starting address within a memory of the FAM circuitry for the first function. The first programmable IC device stores data associated with the first function at the starting address.

BRIEF DESCRIPTION OF DRAWINGS

So that the manner in which the above-recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
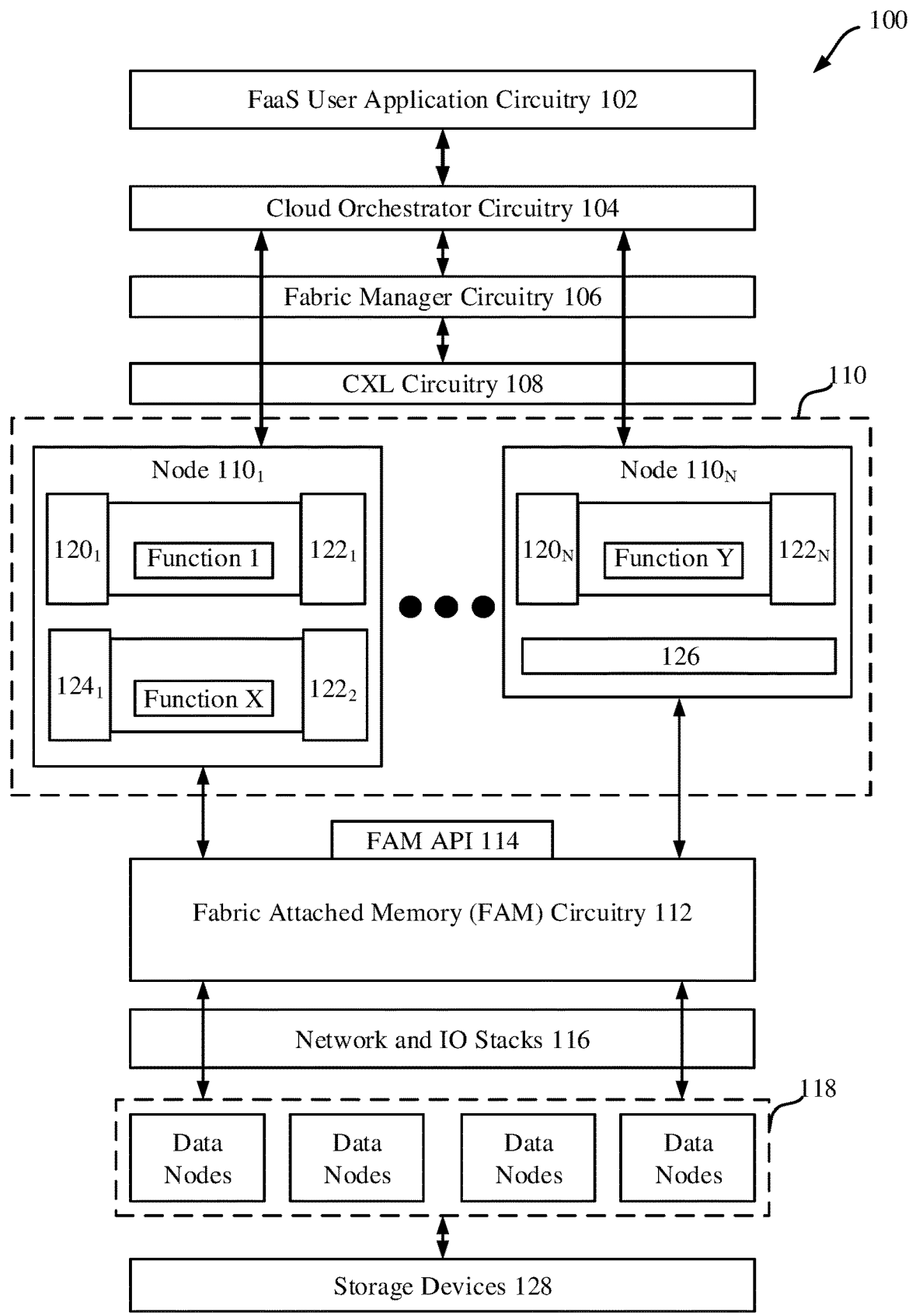
FIG. 1 illustrates a block diagram of a cloud computing system.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

A cloud computing system provides on-demand computer processing resources for executing cloud-native applications. In a serverless cloud computing system, the processing resources are allocated based on demand, without the application developers providing the processing resource capacity, configuration, management, maintenance, fault tolerance, and/or scaling of processing resources. A cloud computing system described herein includes processing nodes (e.g., compute nodes), cloud management circuitry (e.g., a management framework), fabric attached memory (FAM) devices, and remote memory devices, among other cloud computing elements. The cloud computing system further includes a compute express link (CXL) network fabric. CXL network fabric provides a high speed, high capacity processing resource connection to memory (e.g., the memory of the FAM circuitry).

An application (e.g., a cloud native application) is provided to the cloud computing system. The cloud computing system allocates processing resources (e.g., central processing units (CPUs), graphics processing units (GPUs), and/or programmable integrated circuit (IC) devices) based on the functions within the application. Typically, a cloud computing system includes processing units (CPUs and/or GPUs) as the processing resources that complete tasks and store data within the remote memory devices. However, the functions of the applications include daisy-chained tasks, which rely on ephemeral (e.g., short-lived or intermediate) data determined by a previous function. Accordingly, when executing the tasks a large number of read and write data operations with the remote storage device are performed, increasing the data processing complexity, and increasing the chance for processing errors to occur. For example, the increased complexity increases the processing delays and processing unit stalls, increasing the number of job (e.g., application processing) failures.

The cloud computing system described herein manages the ephemeral data and processing resource configurations for scheduling interdependent tasks (e.g., lineage) with pooled memory resources to reduce the number of read and write data operations that are performed with the remote memory devices. A memory of the FAM circuitry is used for the pooled memory resource. The FAM circuitry manages the configuration of the processing resources, schedules the execution of the functions, and co-ordinates the data processing pipeline within the processing resources. The processing resources of the cloud computing system described herein include programmable IC devices (e.g., field programmable gate arrays (FPGAs), complex programmable logic devices (CPLDS), and/or programmable array logic (PAL) devices, among others). Depending on the functions of the tasks of the input application, different combinations of processing units and programmable IC devices are selected for computing the functions. The use of FAM circuitry to store ephemeral data and the use of programmable IC devices to execute the functions reduces the number of read and/or write data operations with remote memory devices, mitigating communication delays and errors that may results. Accordingly, the number of job failures is reduced. Further, the power utilization of the corresponding cloud computing system is reduced as compared to a typical cloud computing system.

FIG. 1 illustrates a block diagram of a cloud computing system 100. In one example, the cloud computing system 100 is a serverless cloud computing system. As is described in more detail in the following, the cloud computing system 100 receives application code, creates task graphs and data graphs from the application code, and allocates processing resources (e.g., processing units and/or programmable IC devices) based on the task graphs and data graphs. Intermediate (e.g., ephemeral) data is stored within the memory of the FAM circuitry of the cloud computing system 100.

The input application is provided as application code. The application code is provided in a high-level programming language. The application code is executed by cloud functions (or λ). Each function is performed by an independent processing resource having independent memory resources.

An input application includes one or more tasks, each tasks corresponds to one or more functions. In one or more examples, functions have a time-budgeted short-lifespan with complex resource constraints (e.g., memory constraints and/or compute constraints). Accordingly, the application code is partitioned into short tasks or functions that can be completed by a processing resource. Further, the resource allocation and scalability is managed to improve interfunction communication (e.g., communication of data between functions). Issues that may arise due to passing data between functions are exasperated in applications that exhibit lineage between functions (e.g., the output of one task is input to the next). In a typical cloud computing system, when executing functions that exhibit lineage, data is stored and read from the remote memory devices. However, to store and read data from the remote memory devices multiple layers of the network circuitry and input/output circuitry are traversed, consuming large amount or processing resources (e.g., memory resources, compute resources, and/or network resources), and causing a large number of delays in data processing. In the cloud computing system of the present disclosure, the data within a function invocation may be cached within the memory of the FAM circuitry, improving the coordination of the intermediate (ephemeral) data. The intermediate data is passed between the functions via the memory of the FAM circuitry, reducing read and write data operations with the remote store devices, reducing the resources used within the corresponding cloud computing device. Accordingly, processing errors within the cloud computing device of the present disclosure are mitigated.

The cloud computing system 100 includes FaaS user application circuitry 102, cloud orchestrator circuitry 104, fabric manager circuitry 106, CXL circuitry 108, processing nodes 110, FAM circuitry 112, FAM API 114, network and IO stacks 116, data nodes 118, and storage devices 130.

The FaaS user application circuitry 102 receives input application (e.g., application code) and communicates the input application to the cloud orchestrator circuitry 104. The cloud orchestrator circuitry 104 receives the input application from the FaaS user application circuitry 102. The cloud orchestrator circuitry 104 generates task graphs, data graphs, and function popularity heap parameter from the input application.

Figure 2:
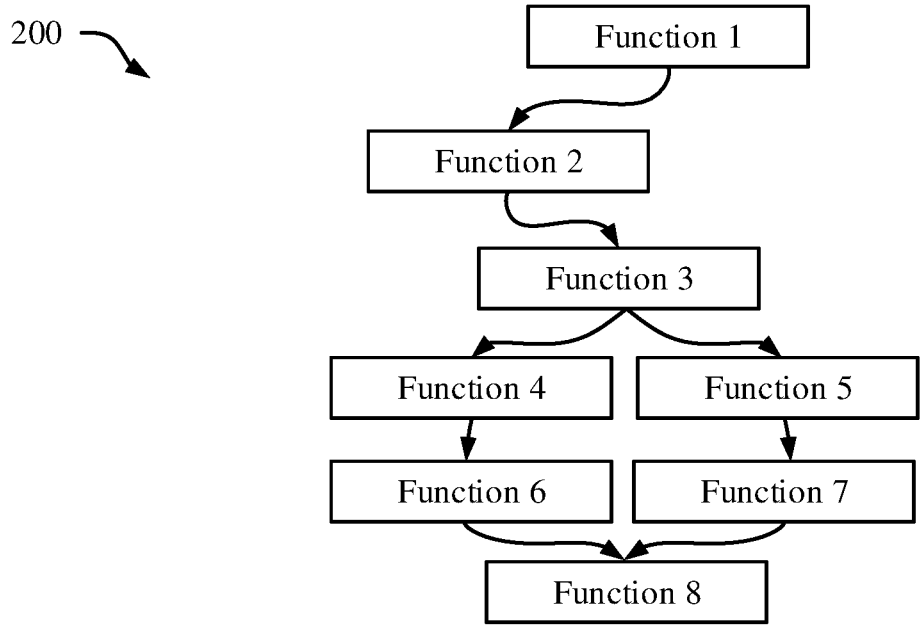
FIG. 2 illustrates an example task graph.

FIG. 2 illustrates an example task graph 200. The task graph 200 includes function 1-function 8. The functions 1-8 are the vertices of the task graph 200 and are connected via edges. The task graph 200 illustrates the function interdependency between the functions. For example, the function 2 is dependent on the function 1. The function 2 is performed based on the completion of the function 1. The functions 4 and 5 are dependent on the function 3, and are performed based on the completion of the function 3. The function 6 is dependent on the function 4, and is performed based on the completion of the function 4. The function 7 is dependent on the function 5, and are performed based on the completion of the function 5. The function 8 is dependent on the functions 6 and 7, and is performed based on the completion of the functions 6 and 7.

A function is dependent on another function is executed when the previous function is completed. For example, the function 2 is executed based on the completion of the function 1 and/or when the output data is made available by the function 1. Further, the function 8 is executed based on the completion of the functions 6 and 7 and/or when the output data is made available by the functions 6 and 7.

A function may be dependent on one or more functions (e.g., the function 8 is dependent on the functions 6 and 7). Further, one or more functions may be dependent on a common function (e.g., the functions 4 and 5 are dependent on the function 3). Further, in one or more examples, the FaaS user application circuitry 102 receives multiple input applications, and a task graph is determined for each of the input applications.

Figure 3:
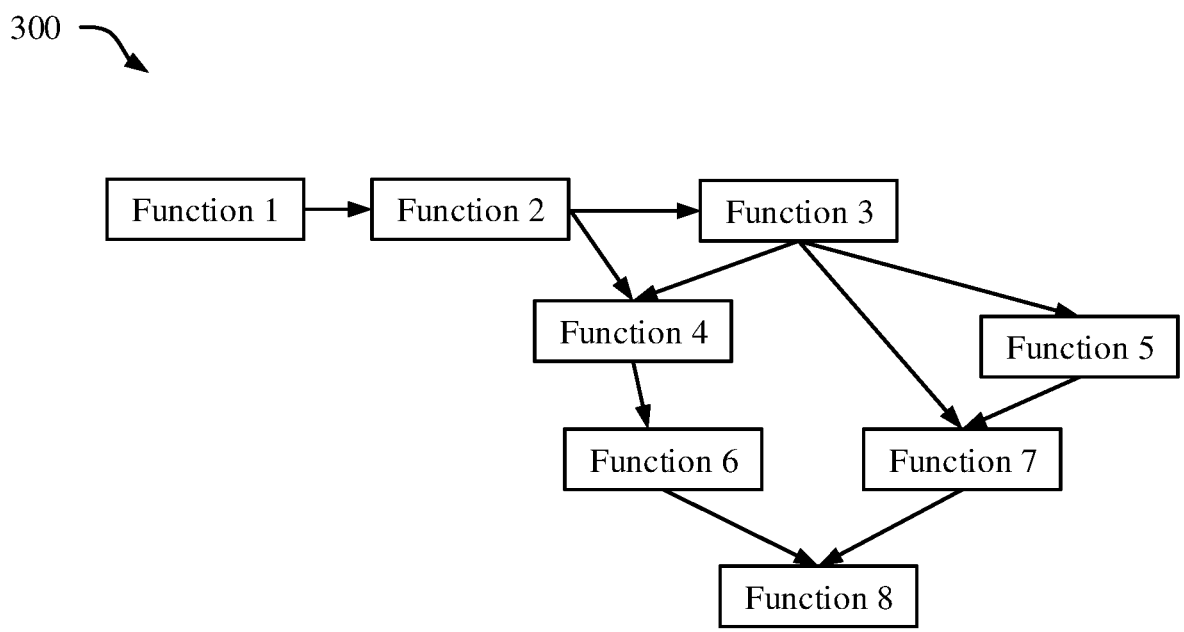
FIG. 3 illustrates an example data graph.

A data graph indicates the data interdependency of the on the output data of the functions. FIG. 3 illustrates the data graph 300. The data graph 300 includes the functions 1-8. The data graph 300 indicates which of functions 1-8 acquire output data from which other functions. The vertices of the data graph are the functions 1-8, and the functions 1-8 are interconnected via edges based on the data dependency between the functions. In the data graph 300, the function 2 receives data from the function 1. Further, the function 3 receives data from the function 1. The function 4 receives data from the functions 2 and 3, and the function 5 receives data from the function 3. The function 6 receives data from the function 4, and the function 7 receives data from the functions 3 and 5. The function 8 receives data from the functions 6 and 7. As is illustrated in FIG. 3, a function may receive data from one or more functions. Further, a function may output data to one or more functions.

In one or more examples, the FaaS user application circuitry 102 receives multiple input applications, and a data graph is determined for each of the input applications.

With further reference to FIG. 1, the cloud orchestrator circuitry 104 determines the function popularity heap parameter for the input application. The function popularity heap parameter corresponds to a function re-usability index ($FR_{idx}$) that is determined for each of the functions of the input application (e.g., the functions 1-8 of FIG. 2). In one or more examples, the FaaS user application circuitry 102 receives multiple input applications, and a re-usability index is determined for each of the functions of each of the input applications. The re-usability index is a running weighted mean of a function's occurrence frequency with higher weights ($w_k$) for more recent occurrences with "k" being the number of time instances in a period of time. Equation 1 defines how the re-usability index is determined for a function F.

$$FR(F)_{idx} = \frac{\sum_{k=1}^{n}\left(\text{Weight } w_k \times \frac{\text{No. of occurences } N(F)_k}{\text{Time interval } T_{iat}(F)_k}\right)}{\sum_{k=1}^{n}(\text{Weight } w_k)} \quad \text{Equation 1}$$

Figure 5:
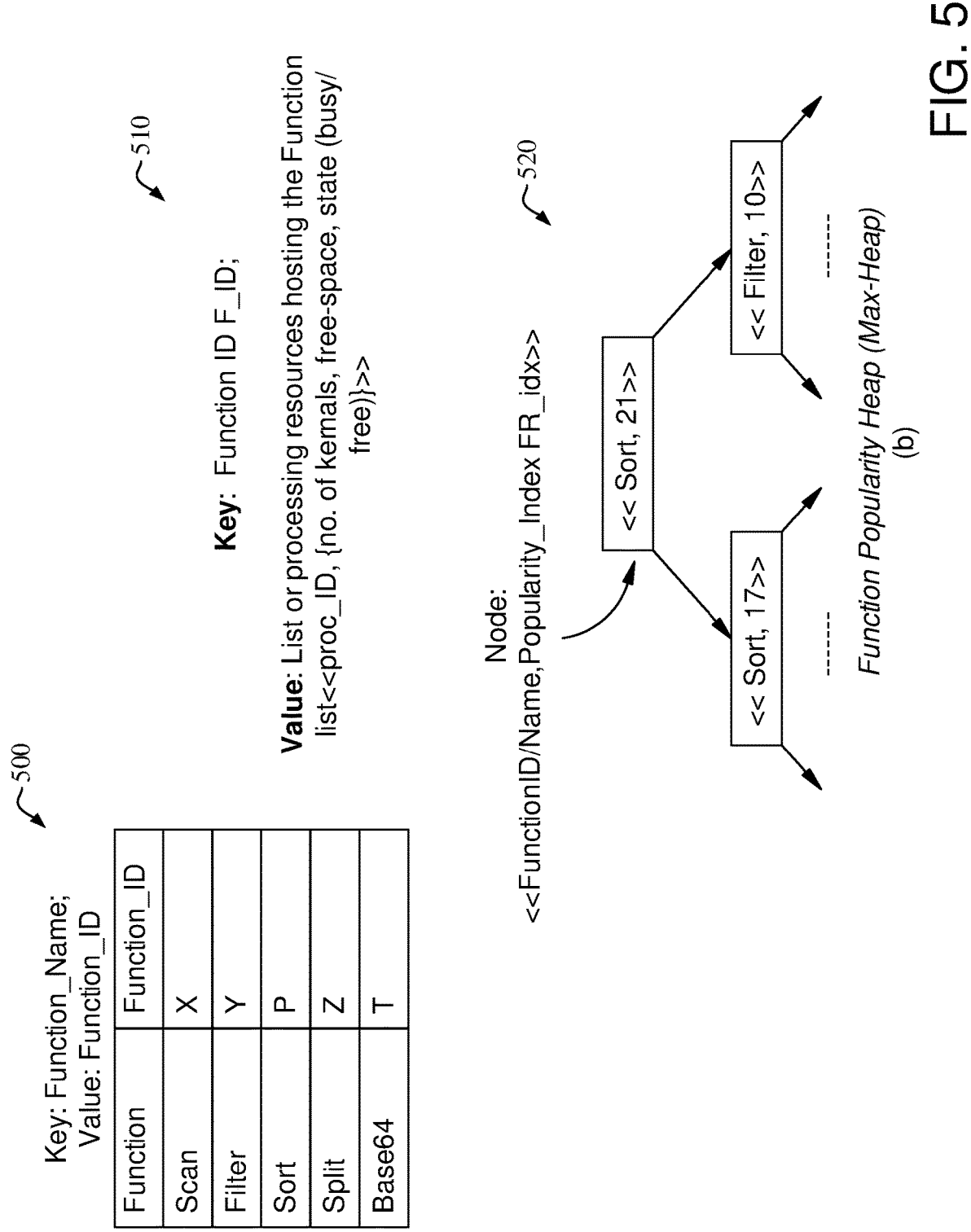
FIG. 5 illustrates a function mapping, a reconfigurable resource map, and a function popularity heap parameter.

The cloud orchestrator circuitry 104 generates and maintains a global data structure representing the function popularity heap parameter. The global data structure indicates a heap value (e.g., a re-usability index) for each of the functions with $FR_{idx}$ as the priority metric. In one example, the heap value is a maximum heap value (e.g., a maximum re-usability index). In other examples, the heap value is greater than a threshold, where the threshold is less than the maximum value. FIG. 5 illustrates a function popularity heap parameter 520. The function popularity heap parameter 520 includes a plurality of nodes that that are interconnected by nodes. Each node includes a function ID and corresponding $FR_{idx}$ value. Each of the nodes is interconnected with another node representing another function. In one example, in the data-structure of FIG. 5, the nodes are in a tree structure and the connections define the priority between the nodes. Traversing the connections navigates through the priorities.

The cloud orchestrator circuitry 104 further determines which, if any, of the functions occur in parallel (e.g., at least partially overlap in the execution of each other). In one example, for each function a parallelism P(F) value is determined. The parallelism P(F) indicates whether or not a function is able to be performed in parallel. The parallelism P(F) value is determined through static code-analysis applied to the input application. In one example, profiling data is used to extract control and data dependence between the functions. The control data and data dependence is used to determine the parallelism P(F) value for each function. For example, functions that have a high data dependence on other functions have a lower parallelism P(F) value and functions that have a lower (or no)_data dependence on other functions have a higher parallelism P(F) value. In one or more examples, the functions that corresponds to parallel loops within the input application.

The fabric manager circuitry 106 maintains a pool of processing resources (e.g., a pool of programmable IC devices 120 and processing units 124). The pool of processing resources includes processing resources associated with functions that can be executed on the processing resources. Further, the pool includes resource allocation decisions for the processing resources. In one or more examples, the fabric manager circuitry maintains the pool of processing resources based on the task graph 200, the data graph 300, and max-heap value of each of the functions received from the cloud orchestrator circuitry 104.

Figure 4:
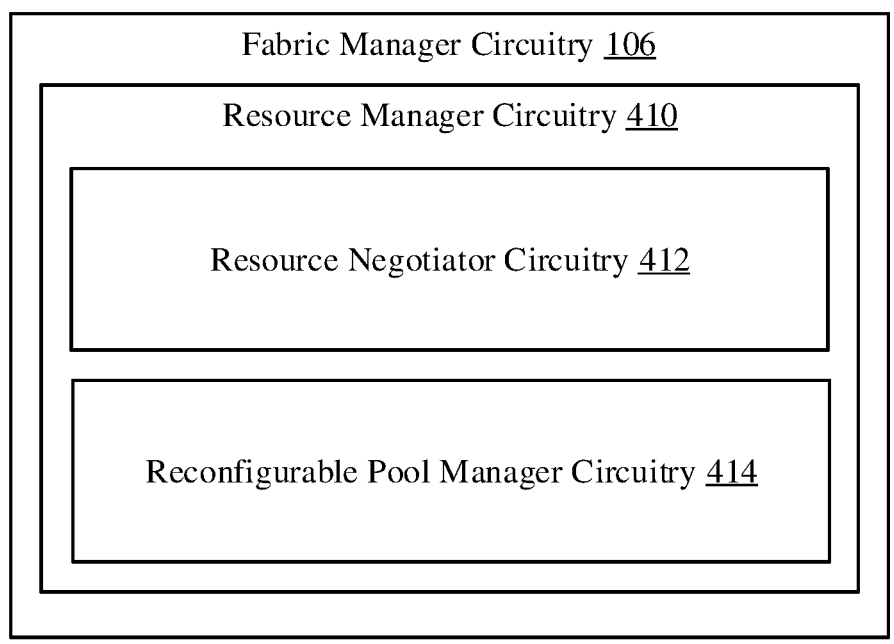
FIG. 4 illustrates a block diagram of fabric manger circuitry.

As is illustrated in FIG. 4, the fabric manager circuitry 106 includes resource manager circuitry 410, resource negotiator circuitry 412, and reconfigurable pool manager circuitry 414. The resource manager circuitry 410 manages the available processing resources (e.g., the programmable IC devices 120 and/or processing units 124). In one or more example, the fabric manager circuitry 106 communicates with the processing resources via the CXL circuitry 108.

FIG. 5 illustrates a map 500 that provides a mapping of supported functions. The functions include a scan function, filter function, sort function, split function, and a Base64 function, among others. Each function is associated with an identifier (ID).

The reconfigurable pool manager circuitry 414 further maintains a reconfigurable resource map 510. The reconfigurable resource map 510 provides an indication between a function and a list of processing resources that support the function. Further, the reconfigurable resource map 510 provides the available kernels for a supported function, the free-space of a processing resource, the state (busy or free) of a processing resource.

The reconfigurable pool manager circuitry 414 loads a list of acceleration supported functions with the corresponding bit-files into a memory in the form of a mapping to mitigate cold-start overhead. An acceleration supported function is a function that is performable by a programmable IC device

120. The list of acceleration supported function and bit-files may be loaded when initializing the cloud computing system 100 of FIG. 1.

With further reference to FIG. 1, the cloud computing system 100 includes CXL circuitry 108. The CXL circuitry 108 provides interconnects for processing systems to load and read data into the memory of each other processing system. In one example, the CXL circuitry 108 includes input/output circuitry and/or cache memory to facilitate the loading and reading of data between the memories of the processing resources.

The cloud computing system 100 further includes processing nodes 110. The processing nodes 110 include N nodes, where N is one or more. Each processing node 110 includes one or more processing resources (e.g., programmable IC device 120 and/or processing units 124) and associated memories 122. Each processing resource performs one or more allocated functions (e.g., function 1, function X, function Y).

A programmable IC device 120 is an FPGA, CPLD, or PAL device, among others. A programmable IC device 120 includes programmable circuitry that is configured via configuration data (e.g., a bitstream). The programmable IC device is configured to execute one or more functions. In one example, the configuration data used to configure a programmable IC device is associated with a kernel. A programmable IC device may execute one or more kernel. Each kernel is associated with a different function. In one example, first programmable circuitry of a programmable IC device is programmed to perform a first function (e.g., a first kernel) and second programmable circuitry of the programmable IC device is programmed to perform a second function (e.g., a second kernel).

The processing units 124 include CPUs, GPUs, or an application specific IC (ASIC), among others.

In one example, at least one processing node 110 includes two or more processing resources (e.g., one or more programmable IC devices 120 and/or one or more processing units 124), and corresponding memories 122. A processing node 110 includes two or more processing resources of the same type or processing resources of different types. For example, a processing node 110 may include one or more programmable IC devices 120. In another example, a processing node 110 includes one or more programmable IC devices 120 and one or more processing units 124. In one or more examples, a processing node 110 additionally, or alternatively, includes a shared memory 126. In one example, the shared memory 12 is used to store state and ephemeral data that is shared among the functions between different processing nodes 110.

The cloud computing system 100 further includes the FAM circuitry 112. The FAM circuitry 112 includes a memory that is accessible (and shared) by each of the processing nodes 110 and the corresponding processing resources (e.g. the programmable IC devices 120 and the processing units 124). The FAM circuitry 112 is controlled via FAM application programming interface (API) 114. In one example, the memory of the FAM circuitry 112 stores ephemeral data (e.g., short-lived intermediate data) generated by the processing nodes 110.

The network and IO stacks 116 of the cloud computing system 100 provide an interconnect between the data nodes 118. The data nodes 118 provide cloud storage for the cloud computing system 100. The data output from the cloud computing system 100 is output to the storage devices 128. In one example, the storage devices 128 are external to the cloud computing system 100, and is not included within the cloud computing system 100.

In one or more examples, the CXL circuitry 108 provides for the realization of memory disaggregation with the cloud computing system 100. The CXL circuitry 108 functions as an interconnect for multiple heterogeneous processors (e.g., the programmable IC devices (or accelerator devices) 120) and other processing elements (e.g., the processing units 124) to share memory (e.g., the memory of the FAM circuitry 112 and/or the storage devices 128). In one or more examples, the CXL circuitry 108 allows for disaggregation with features such as memory pooling and processing resource sharing. Accordingly, the processing resources are able to access and share pools of unattached memory (e.g., the memory of the FAM circuitry 112 and/or the storage devices 128). In one or more examples, the memory of the FAM circuitry 112 and/or the storage devices 129 include CXL protocols to allow the processing resources of the processing nodes 110 to communicate with the memory of the FAM circuitry 112 and/or the storage devices 129.

In one or more examples, computation is offloaded to the FAM circuitry 112, which averts fetching data from the storage devices 128. The CXL circuitry 108 functions to offload the computation of functions to the programmable IC devices 120 and the memory of the FAM circuitry 112. Further, using the memory of the FAM circuitry 112 to store intermediate (e.g., ephemeral data) generated by the programmable IC devices 120, increases the processing bandwidth and reduces latency with memory bound operations.

The fabric manager circuitry 106 receives data packets from the processing resources of the processing nodes 110, and processes and decodes the data packets. The decoded information is used to allocate and schedule processing resources of the processing nodes 110. A list of tasks (e.g., a task graph) and input/output data list (e.g., a data graph). Further, the FAM circuitry 112 allocates a starting address within the memory of the FAM circuitry 112.

Figure 6:
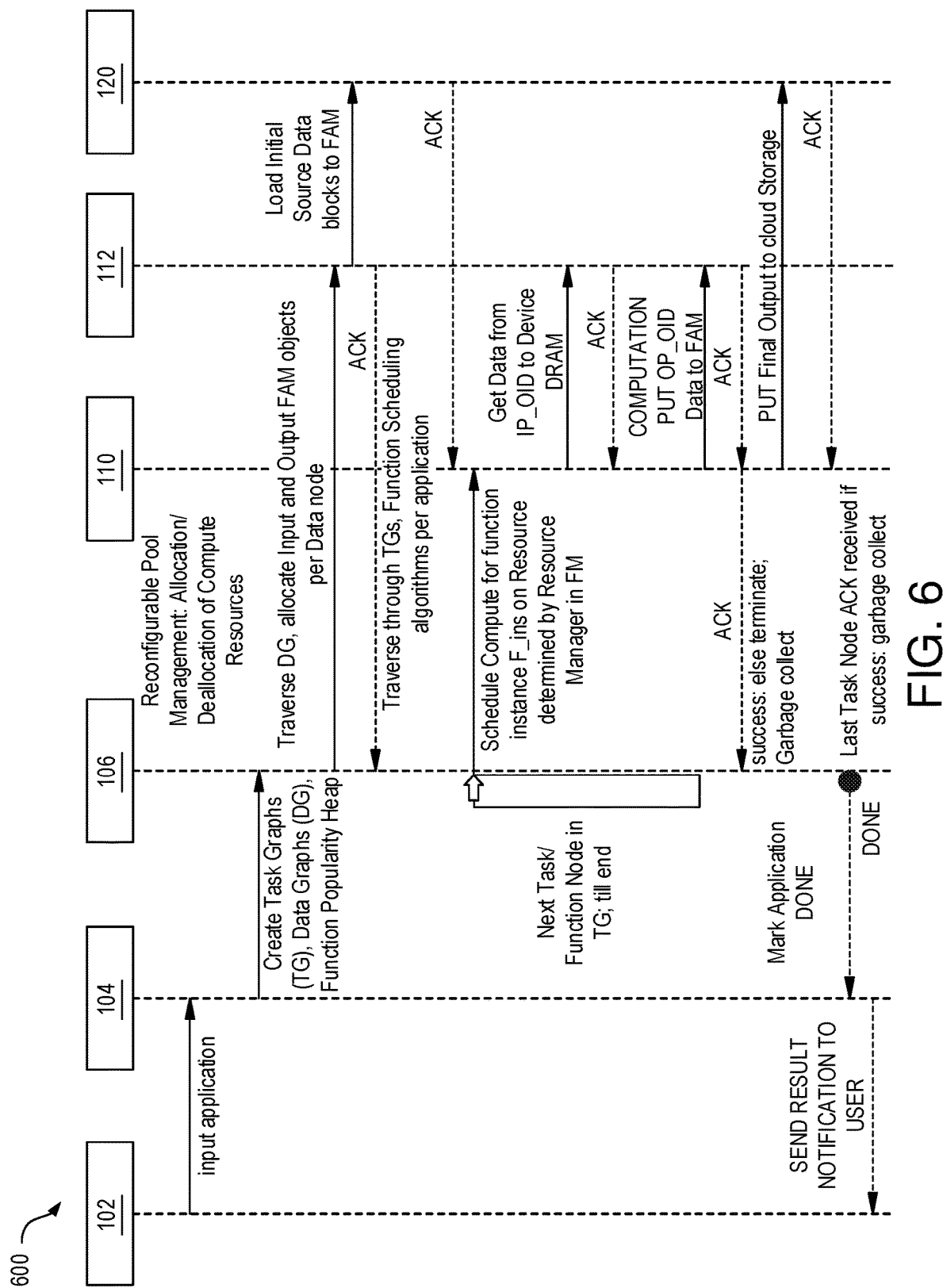
FIG. 6 illustrates a timing diagram for executing an application within a cloud computing system.

FIG. 6 illustrates a data management workflow 600 for the cloud computing system 100. The workflow 600 starts receiving an input application. The input application is received by the FaaS user application circuitry 102. The input application 602 is provided to the cloud orchestrator circuitry 104. The cloud orchestrator circuitry 104 generates one or more task graphs, one or more data graphs, and a function popularity heap parameter for the input application. The one or more task graphs, one or more data graphs, and the function popularity heap parameter are provided to the fabric manager circuitry 106.

The fabric manager circuitry 106 allocates one or more of the processing resources (e.g., one or more programmable IC devices 120 and/or one or processing units 124) based on one or more task graphs, one or more data graphs, and the function popularity heap parameter. The fabric manager circuitry 106 may further deallocate one or more of the processing resources based on one or more task graphs, one or more data graphs, and the function popularity heap parameter. Further, the fabric manager circuitry 106 allocates starting address within the memory of the FAM circuitry 112 for each of the functions. The fabric manager circuitry 106 traverses the one or more data graphs to determine the starting address for each of the functions. The starting address and associated functions are provided to the FAM circuitry 112. The FAM circuitry 112 loads corresponding source data for the functions from the storage devices 128.

The fabric manager circuitry 106 receives an acknowledgement from the FAM circuitry 112 based on loading the source data in the memory of the FAM circuitry 112. The fabric manager circuitry 106 schedules the functions by traversing the one or more task graphs. Scheduling the functions includes scheduling when the corresponding processing resources execute a particular function. Further, the fabric manager circuitry 106 schedules compute for function instances within the processing resources determined by the resource manager circuitry 410 of FIG. 4. Based on scheduling the compute for the function instances, the allocated programmable IC devices 120 of the processing nodes 110 obtain data for the associated function. The programmable IC devices 120 execute the function or functions and output data to the FAM circuitry 112.

An acknowledgement that a function is successfully completed is provided to the fabric manager circuitry 106. The fabric manager circuitry 106 performs a garage collection process to allocate any used memory for future use. Further, a next task (e.g., function) is performed, and the process is completed until each task is performed.

When each task has been performed, final output data is provided from memory of the FAM circuitry 112 to the storage devices 128. Further, the application is marked "done" and a notification is output from the cloud computing system 100 (e.g., displayed on a display, stored in a memory, and/or printed, among others).

Figure 7:
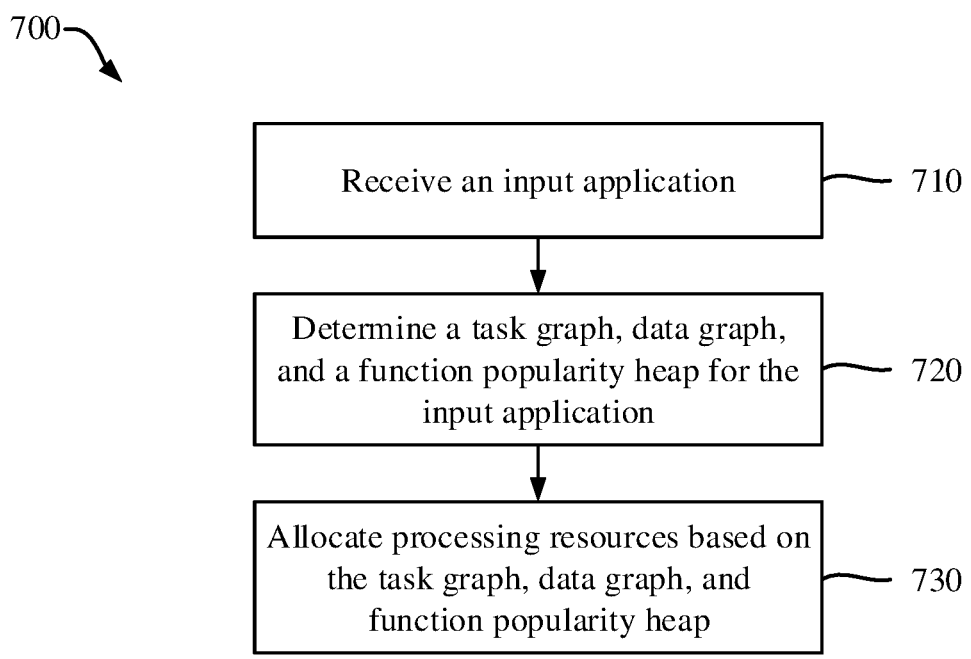
FIG. 7 illustrates a flowchart of a method for operating a cloud computing system.

FIG. 7 illustrates a flowchart of a method 700 for operating a cloud computing system (e.g., the cloud computing system 100 of FIG. 1). At 710 of the method 700, an input application is received. The input application is received by the FaaS user application circuitry 102 of FIG. 1. The input application is provided in a high-level programming language code. The FaaS user application circuitry 702 provides the input application to the cloud orchestrator circuitry 104 of FIG. 1.

At 720 of the method 700, a task graph, a data graph, and a function popularity heap parameter are determined for the input application. The cloud orchestrator circuitry 104 of FIG. 1 determines a task graph, a data graph, and a function popularity heap parameter for the input application. The cloud orchestrator circuitry 104 processes the input application to detect each task. Further, the cloud orchestrator circuitry 104 determines the interdependencies between each of the tasks, generating the task graph (e.g., the task graph 200 of FIG. 2). For example, the cloud orchestrator circuitry 104 determines which task is dependent on the completion of another task to determine the interdependencies. The cloud orchestrator circuitry 104 generates the task graph based detected tasks and the determined interdependencies. Further, the cloud orchestrator circuitry 104 determines a data graph from the input application. The cloud orchestrator circuitry 104 processes the input application to identify the input data to each function and the output data of each function. The cloud orchestrator circuitry 104 determines the data dependencies between the functions based on the input data and output data of each function. Determining the data dependencies includes determining the input data used by each function, and from what other function that input data is output from. The functions and data dependencies are used to generate the data graph (e.g., the data graph 300 of FIG. 3).

The cloud orchestrator circuitry 104 further determines the function popularity heap parameter for the input application. The function popularity heap parameter is determined for each function as described above. For example, the function popularity heap parameter corresponds to a function re-usability index ($FR_{idx}$) for each of the functions for the input application.

At 730 of the method 700, processing resources are allocated based on the task graph, the data graph, and the function popularity heap parameter. For example, the fabric manager circuitry 106 of FIG. 1 receives the task graph, the data graph, and the function popularity heap parameter from the cloud orchestrator circuitry and allocates the programmable IC devices 120 within the processing nodes 110. In one example, the fabric manager circuitry 106 determines which functions are supported by the programmable IC devices 120 (e.g., acceleration supported functions), and allocates available programmable IC devices 120 that support the functions to perform the functions. In one example, the fabric manager circuitry 106 de-allocates one or more programmable IC devices 120, and re-allocates the programmable IC devices 120 to perform supported functions. Further, functions that are not supported by the programmable IC devices 120 are allocated to be performed by a processor unit 124. In one example, the fabric manager circuitry 106 determines that a function is not supported by the programmable IC devices 120, and configures one or more of the programmable IC devices 120 with an updated kernel to perform the function. The function can then be allocated to the reconfigured programmable IC device 120.

The functions are computed by the processing nodes 110, and intermediate data is stored within the memory of the FAM circuitry 112. For example, when executing the functions via the programmable IC devices 120 and/or the processor units 124, the intermediate data is stored within the memory of the FAM circuitry 112. The intermediate data is ephemeral data that is used by another function to generate the final output data. Reading and writing the intermediate data from the memory of the FAM circuitry 112 reduces reads and writes made to the storage devices 128, reducing communication via the network and IO stacks 116. Accordingly, processing and data errors (e.g., processing delays and/or stalls) are mitigated, improving the performance of the cloud computing system 100. The output data is generated by the processing nodes 110 performing the functions and is provided to the storage devices 128.

Figure 8:
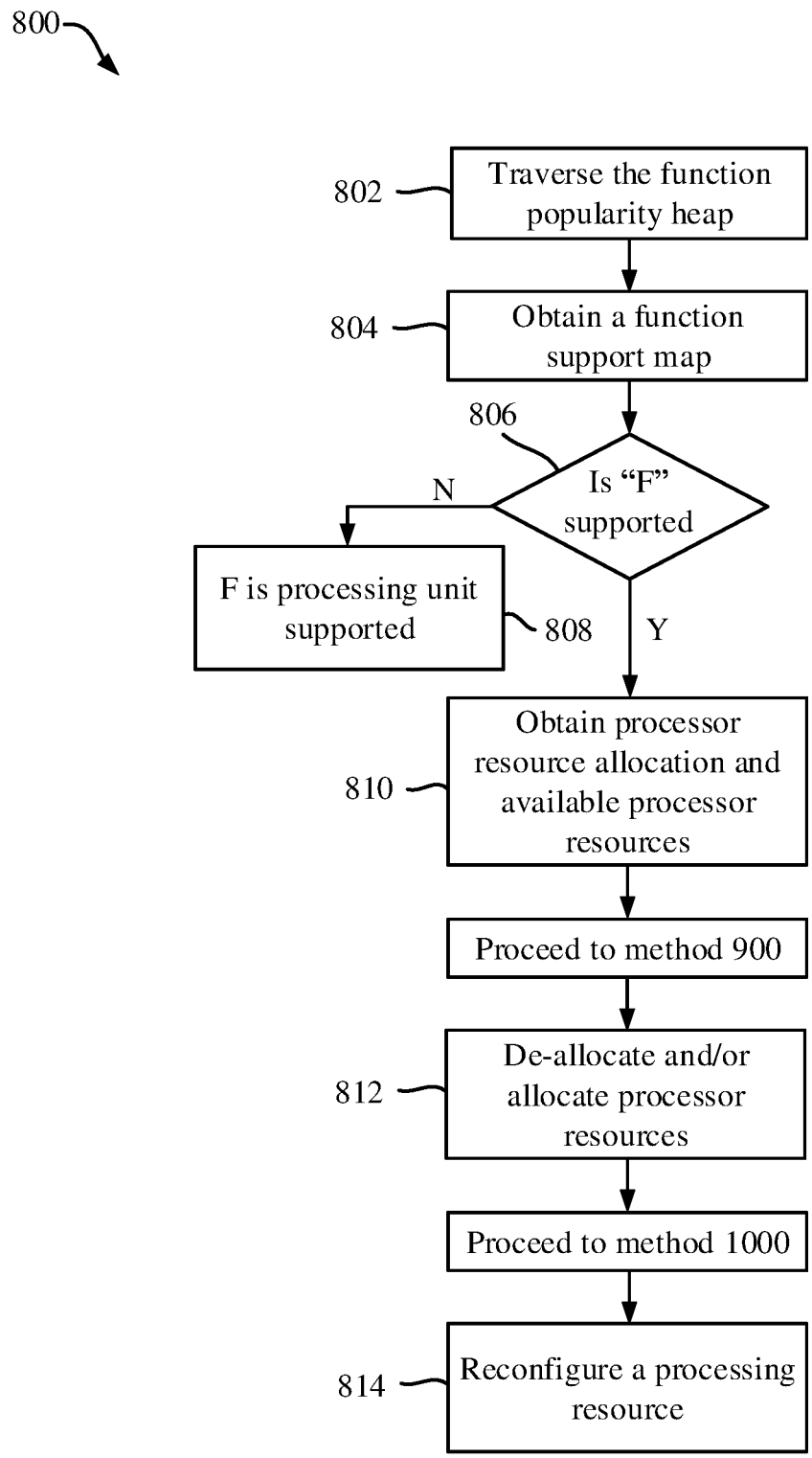
FIG. 8 illustrates a flowchart of a method for allocating processing resources.
Figure 9:
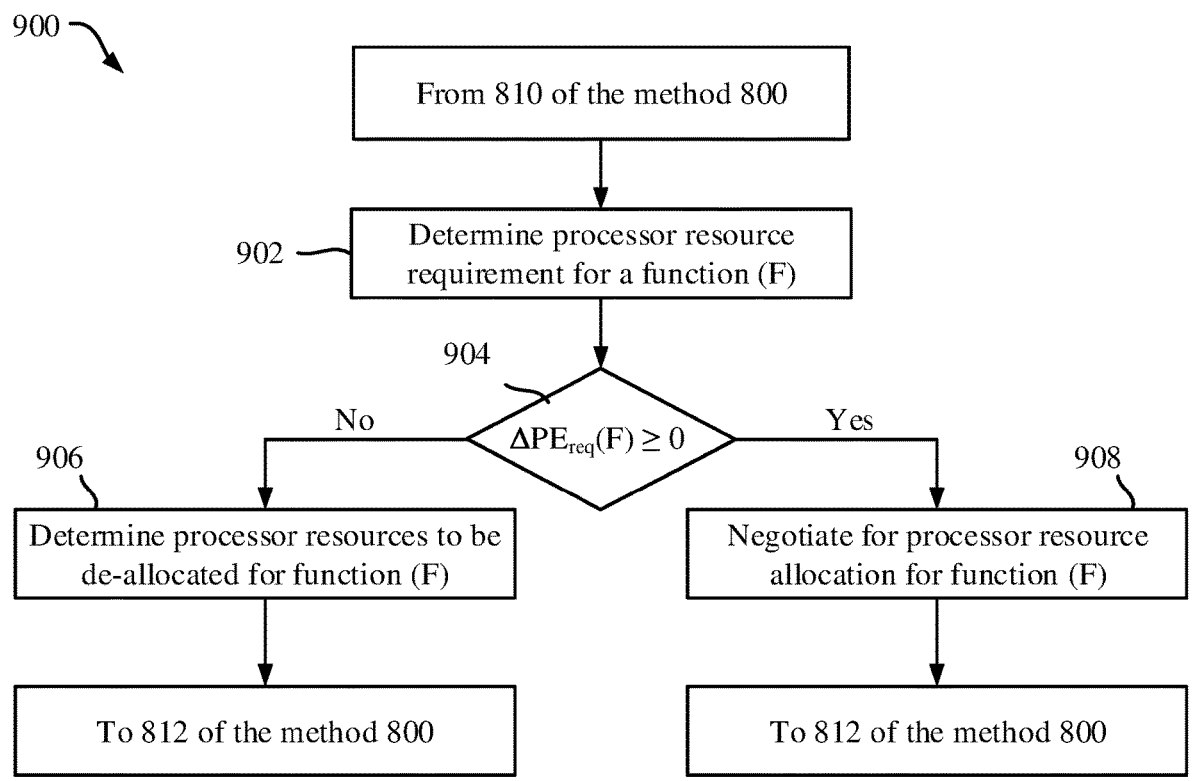
FIG. 9 illustrates a flowchart of a method for allocating and/or deallocating processing resources.
Figure 10:
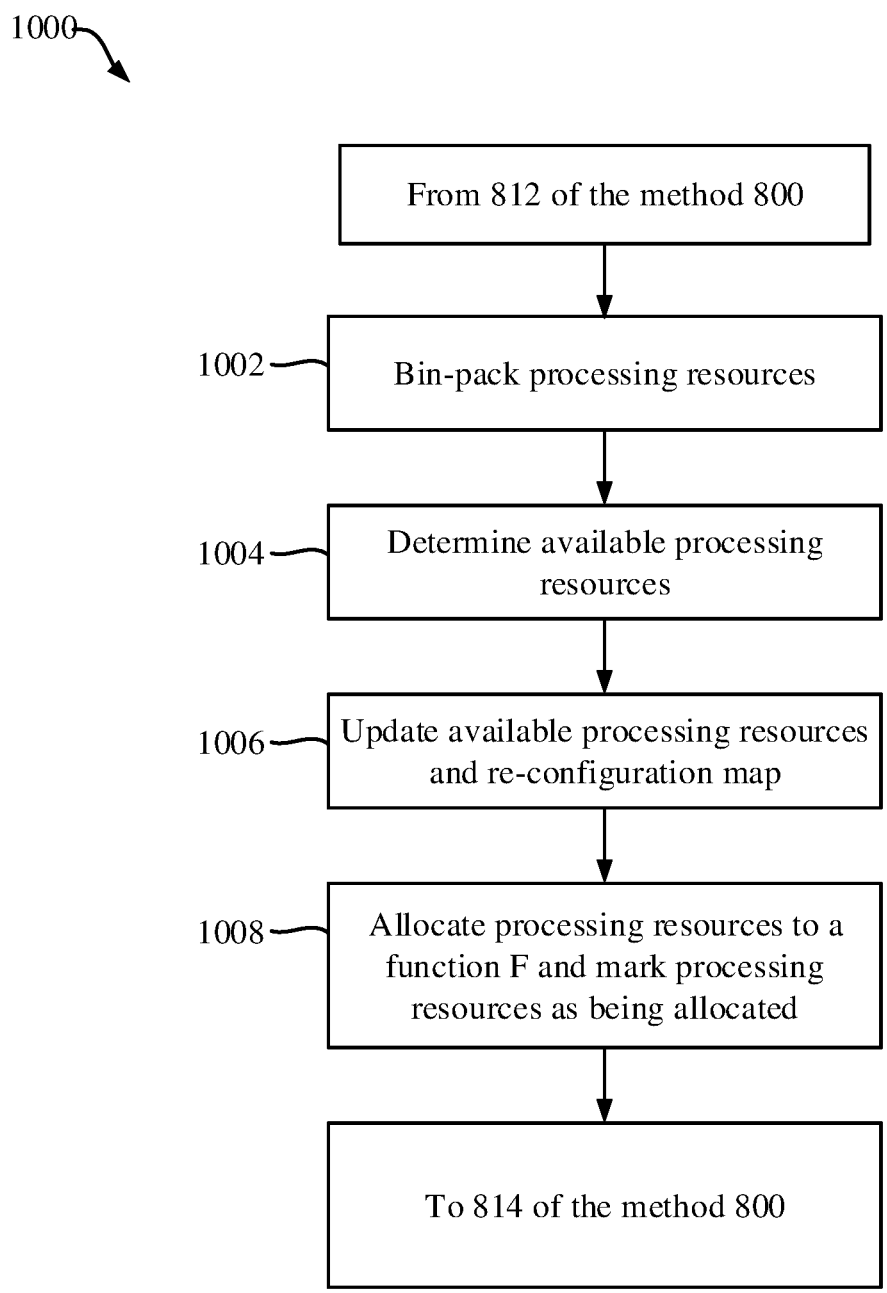
FIG. 10 illustrates a flowchart of a method for updating available processing resources and a re-configuration map.

FIG. 8 illustrates a flowchart of a method 800 for allocating processing resources, according to one or more examples. In one or more examples, the method 800 is used to efficiently allocate the programmable IC devices 120, and provides for dynamic control of the pool of processing resources.

The method 800 is performed by the fabric manager circuitry 106 of FIG. 1. At 802 of the method 800, the function popularity heap parameter is traversed. The reconfigurable pool manager circuitry 414 traverses the function popularity heap parameter at fixed time intervals. In one example, the fixed time intervals correspond to one or more epochs. The fixed time intervals may be provided along with or independent from the input application. The reconfigurable pool manager circuitry 414 obtains the function popularity heap parameter from the cloud orchestrator circuitry 104 of FIG. 1. The reconfigurable pool manager circuitry 414 determines the popularity of a function (e.g., the number of times a function is included within the input application or applications). Functions that occur more often within an input application or applications has a higher popularity value.

Figure 12:
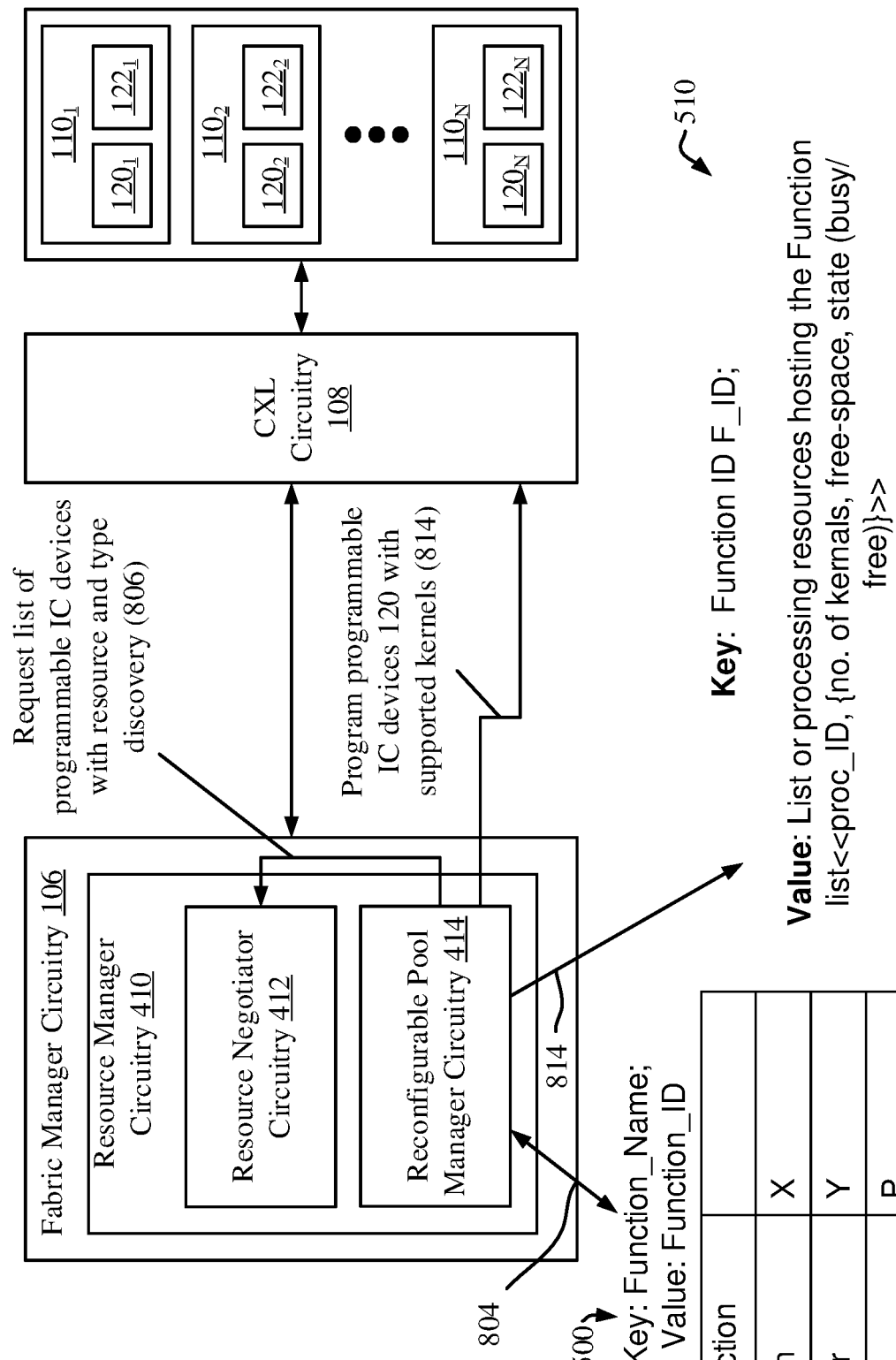
FIG. 12 illustrates the fabric manger circuitry, the CXL circuitry, and the processor nodes and the corresponding method for allocating processing resources and updating programmable integrated circuit devices.

At 804 of the method 800, a function support map is obtained. For example, as illustrated in FIG. 12, the reconfigurable pool manager circuitry 414 obtains the function support map 500 of FIG. 5, indicating which functions are supported by a programmable IC device 120, and a corresponding ID of the function.

At 806 of the method 800, a determination as to whether or not a function is supported is made. For example, a function is compared to the function support map (e.g., the function support map 500 of FIG. 5) to determine if a function is able to be executed by a programmable IC device 120 (e.g., a function is supported). A function that is included in the function support map is determined to be executable by a programmable IC device 120. A function that is not included within the function support map is determined to not be executable by the programmable IC device 120.

If at 806 of the method 800, a function is determined to not be supported by a programmable IC device 120, the function is determined to be processing unit supported at 808, and a processing unit 124 is allocated for performing the function. If at 806 of the method 800, a function is determined to be supported by a programmable IC device, available processing resources are obtained at 810 of the method 800. For example, the resource negotiator circuitry 412 requests a list of programmable IC devices 120 with resource and type discovery from the reconfigurable pool manager circuitry 414.

The method 800 proceeds to 902 of the method 900 from 810 of the method 800. At 902 of the method 900, a processing resource requirement for a function (F) is determined. For example, the reconfigurable pool manager circuitry 414 determines the processing resource requirement for a function (F) based on equation 2.

$$PE_{req}(F) = \alpha \left( \frac{N(F)}{T_{iat}(F)} \right) \times \left( \frac{P(F)}{Freq(Proc)} \right) \quad \text{Equation 2}$$

Equation 2 determines the number of processing resources for a given function (F). The number of processing resources is based on the number of occurrences of the function (F) (N(F), the time interval for performing the function ($T_{iat}$(F)), whether or not the functions can be performed in parallel, and a processor frequency.

At 904 of the method 900, a determination as to whether or not a difference between the required processing resources for a function (F) ($PE_{req}$(F)) and the allocated processing resources for a function (F) ($PE_{alloc}$(F)) is greater than 0. Equation 3 is used to determine the difference between $PE_{req}$(F) and $PE_{alloc}$(F). When $\Delta PE_{req}$(F) is greater than or equal zero, there are enough processing resources available to allocate to perform a function (F), and when $\Delta PE_{req}$(F) is less than zero, there are not additional processing resources to allocate to perform a function (F).

$$\Delta PE_{req}(F) = PE_{req}(F) - PE_{alloc}(F) \quad \text{Equation 3}$$

If at 904 of the method 900, $\Delta PE_{req}$(F) is determined to be less than zero, processing resources are determined for de-allocation for the function (F) at 906 of the method 900. Processing resources that are allocated but not being used for computation of another function may be detected and determined for de-allocation by the resource negotiator circuitry 412. The method 900 proceeds to 812 of the method 800. If at 904 of the method 900, $\Delta PE_{req}$(F) is determined to be greater than or equal to zero, processing resources are negotiated for allocation for the function (F) at 908 of the method 900. For example, the resource negotiator circuitry 412 request allocation of the available processing resources (e.g., the programmable IC devices 120). In one example, the resource negotiator circuitry 412 identifies (e.g., determines) all of the programmable IC devices 120, and allocates programmable IC devices 120 depending on the availability of the requirements of the corresponding function or functions. The negotiation is a request for resource allocation. In one example, the reconfigurable pool manager circuitry 414 requests the resources from the resource negotiator circuitry 412. In one or more examples, the programmable IC device (or devices) 120 is allocated to the function F depending on state of the programmable IC device 120, the resource requirement of the function, and kernel space requirement. The method 900 proceeds to 812 of the method 800.

At 812 of the method 800, processing resources are de-allocated and/or allocated based on the method 900. In one example, the reconfigurable pool manager circuitry 414 negotiates with the resource negotiator circuitry 412 to deallocate one or more of the programmable IC devices 120 from being used to compute a function. De-allocating a programmable IC device 120 includes reinitializing a programmable IC device 120. In one example, de-allocating a processing resource includes de-allocating one or more kernels within a programmable IC device 120. In one or more examples, de-allocation of a processing resource occurs based on the completion of the corresponding data processing (e.g., loading the input from nodes within the memory of the FAM circuitry 112, computation processes, and writing the output to the memory within the FAM circuitry 112 using FAM API 114). In one example, the fabric manager circuitry 106 waits for completion notification (e.g., an acknowledgement) before spawning the next ephemeral dependent task in the task-graph. On completion, the fabric manager circuitry 106 invokes the garbage collection for the ephemeral data (input and output) to release the memory and compute resources and marks the status of associated compute resources in reconfiguration map as free (or available). Based on the completion of all of the computations (or termination of the function) and reaching the end of the task-graph for an input application, the cloud orchestrator circuitry 104 is notified for result collection. The final output data is stored within the memory of the FAM circuitry 112 or within the remote storage devices 128. In one example, the garbage collection routine is triggered to free any associated runtime, memory, and compute resources.

Allocating a programmable IC device 120 includes initializing (or assigning) an available programmable IC device 120 to perform a function of an input application. In one example, allocating a programmable IC device 120 includes allocating (or assigning) one or more available kernels of the programmable IC device 120 to perform the function.

Subsequent 812 of the method 800, the method 1000 is performed. The method 1000 includes 1002, bin-packing processing resources. The reconfigurable pool manager circuitry 414 analyzes the programmable IC devices 120, and determines the number of kernels operating on each programmable IC device. The number of kernels is associated with each corresponding IC device and is stored as a bin mapping. At 1004 of the method 1000, available processing resources are determined. For example, the reconfigurable pool manager circuitry 414 determines programmable IC devices 120 that are able to be loaded (e.g., configured) with additional kernels to perform additional functions based on the bin mapping. The programmable IC devices 120 that are able to be loaded with additional kernels are flagged (or associated with another indication).

At 1006 of the method 1000, the available processing resources and re-configuration map are updated. The reconfigurable pool manager circuitry 414 updates the available processing resources and re-configuration map based on the programmable IC devices 120 that are identified as being able to be loaded with additional kernels. The reconfigurable pool manager circuitry 414 updates the reconfigurable resource map 510 of FIG. 5 based on the available kernels in each of the programmable IC devices 120.

At 1008 of the method 1000, processing resources are allocated for the function (F) and the allocated processing resources are marked (e.g., indicated) as such. For example, the resource negotiator circuitry 412 allocates one or more of the programmable IC devices 120 to the function (F), and updates the corresponding mapping to indicate the programmable IC devices 120 is allocated. The programmable IC devices 120 that are allocated are determined to have available space (e.g., space to be loaded with the corresponding kernel, or a kernel available to perform) to execute the function. The method 1000 proceeds to 814 of the method 800.

At 814 of the method 800, a processing resource is reconfigured. For example, the reconfigurable pool manager circuitry 414 reconfigures a programmable IC device 120 with a kernel that is able to perform the function (F). The mapping for the corresponding programmable IC device 120 is updated by the reconfigurable pool manager circuitry 414.

Figure 11:
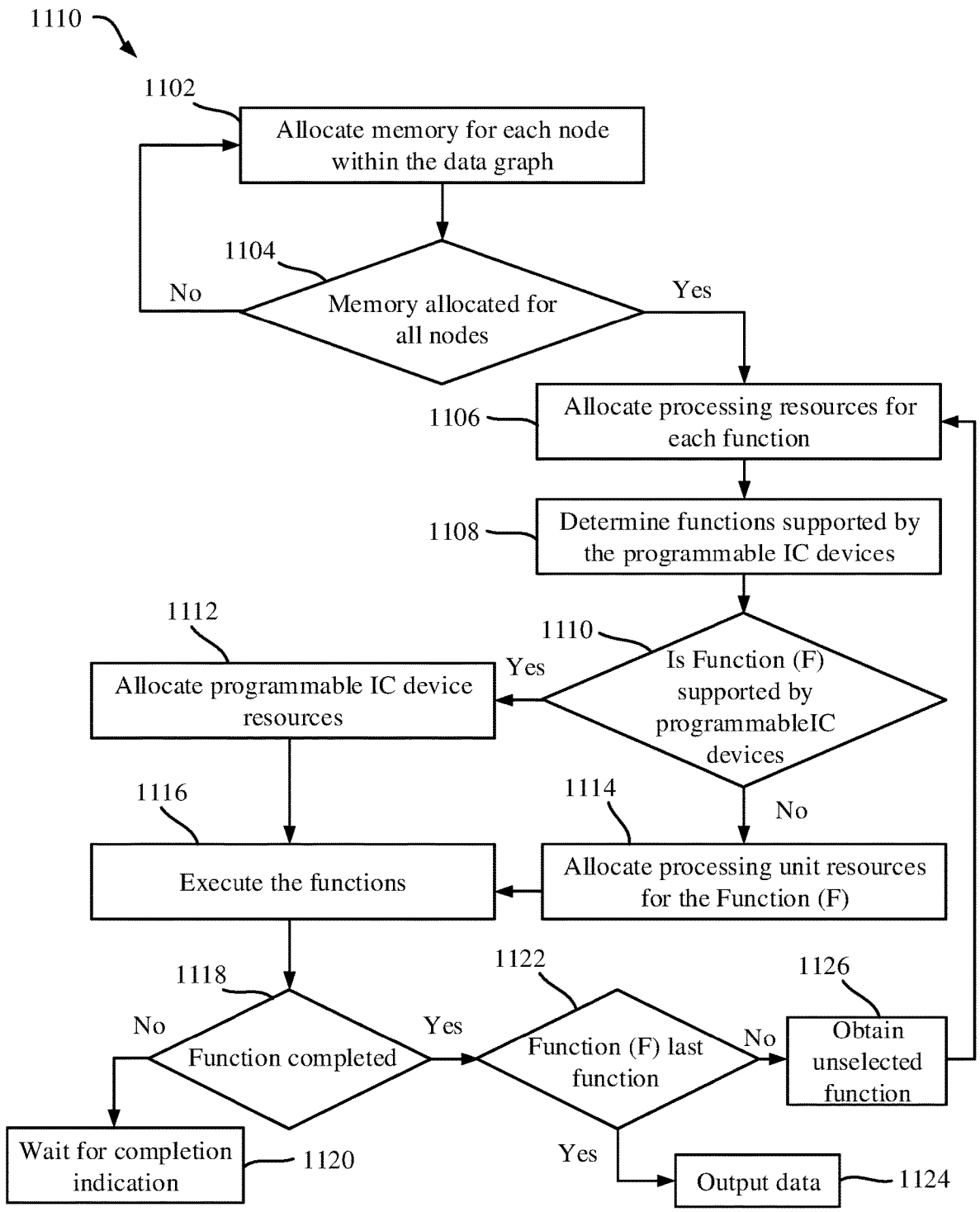
FIG. 11 illustrates a flowchart of a method for reconfiguring a processing resource

FIG. 11 illustrates a flowchart of the method 1100 for allocating memory for the processing resources and executing functions of an input application, according to one or more examples. At 1102 of the method 1100, memory for each node within a data graph is allocated. For example, with reference to FIG. 1 and FIG. 3, the FAM circuitry 112 allocates a starting address within the memory of the FAM circuitry 112 for each node (e.g., function) within the data graph 300. The starting address indicates where data for a node within the data graph 300 will be stored within the memory of the FAM circuitry 112.

At 1104 of the method 1100 a determination is made as to whether or not all of the nodes are allocated memory. For example, the FAM circuitry 112 determines whether or not each of the nodes (e.g., functions) of the data graph 300 of FIG. 3 are allocated memory. At 1104 of the method 1100, if one or more of the nodes is determined to not have memory allocated (e.g., does not have a starting address within the memory of the FAM circuitry 112), the method 1100 proceeds to 1102. If a determination that all nodes are allocated memory at 1104 of the method 1100, the method 1100 proceeds to 1106 of the method 1106. At 1106 of the method 1100, processing resources for each function are allocated. In one example, the cloud orchestrator circuitry 104 of FIG. 1 negotiates with the resource manager circuitry 410 of FIG. 4 to allocate processing resources for a function. Negotiating with the resource manager circuitry 410 determines which processing resources (e.g., which of the programmable IC devices 120 and processor units 124) are able to execute one or more of the functions. The resource manager circuitry 410 communicates with the processing resources of the processing nodes 110 via the CXL circuitry 108.

At 1108 of the method 1100, the functions supported by programmable IC devices is determined. For example, the resource manager circuitry 410 obtains the supported function map (e.g., the map 500 of FIG. 5), to determine which of the functions are able to performed by a programmable IC device 120 and is able to be accelerated.

At 1110 of the method 1100, a determination as to whether or not a function is supported by the programmable IC devices is made. The resource manager circuitry 410 determines whether not a function is supported by the programmable IC devices 120 by comparing the function to the supported function map to determine if the function is listed within the supported function map. Based on a determination that the function is not supported at 1110 of the method 1100, processing unit (e.g., the processing unit 124) resources are allocated by the resource manager circuitry 410 at 1114 of the method 1100. Based on a determination that the function is supported at 1110 of the method 1100, programmable IC device 120 resources are allocated by the resource manager circuitry 410 at 1114 of the method 1100.

At 1116 of the method 1100, the function is executed. The functions are executed by the processing nodes 110 and data is stored within the memory of the FAM circuitry 112. At 1118 of the method 1100, a determination as to whether or not a function is completed is made. For example, the cloud orchestrator circuitry 104 determines whether or not the functions are completed. If the functions are not completed, the cloud orchestrator circuitry 104 waits for an indication that the function is complete at 1120 of the method 1100. The indication may be a time-out trigger. If the function is determined to be completed at 1118, a determination is made as to whether or not the current function (function (F)) is the last function to be executed at 1122. If the cloud orchestrator circuitry 104 determines that the current function is the last function to be executed, the data is output to the storage devices 128 of FIG. 1. If the cloud orchestrator circuitry 104 determines that the current function is not the last function to be executed, an unselected function is obtained at 1126, and the method 1100 proceeds to 1106 of the method 1100, and the corresponding process is repeated for the selected function.

In the above, a cloud computing system is described that manages the ephemeral data and processing resource configurations. The cloud computing system schedules interdependent tasks (e.g., lineage) with pooled memory resources to reduce the number of read and write data operations that are performed with the remove memory devices. A memory of the FAM circuitry is used for the pooled memory resource. The FAM circuitry manages the configuration of the processing resources, schedules the execution of the functions, and co-ordinates the data processing within the processing resources. The use of memory within a FAM circuitry to store ephemeral data and the use of programmable IC devices to execute the functions reduces the number of read and/or write data operations with remote memory devices, mitigating communication delays and errors that may results.

While the foregoing is directed to specific examples, other and further examples may be devised without departing from the basic scope thereof, and the scope thereof is determined by the claims that follow.

What is claimed is:
1. A cloud computing system comprising:
cloud orchestrator circuitry configured to receive an input application and determine a task graph, a data graph, and a function popularity heap parameter for the input application, wherein the task graph comprises an indication of function interdependency of functions of the input application, the data graph comprises an indication of data interdependency of the functions, and the function popularity heap parameter corresponds to a re-usability index for the functions; and fabric manager circuitry configured to allocate a first programmable integrated circuit (IC) device to perform a first function of the input application based on the task graph, the data graph, and the function popularity heap parameter.

2. The cloud computing system of claim 1, wherein allocating the first programmable IC device to perform the first function includes:
 determining that the first function is supported by the first programmable IC device based on a function support map.

3. The cloud computing system of claim 1, wherein allocating the first programmable IC device to perform the first function includes:
 determining a processing resource requirement for the first function; and
 negotiating to allocate the first programmable IC device based on a number of available processing resources being at least as large as the processing resource requirement.

4. The cloud computing system of claim 1, wherein allocating the first programmable IC device to perform the first function includes:
 determining a processing resource requirement for the first function; and
 de-allocating the first programmable IC device based on a number of available processing resources being less than the processing resource requirement.

5. The cloud computing system of claim 1 further comprising fabric attached memory (FAM) circuitry configured to:
 allocate a starting address within a memory of the FAM circuitry for the first function.

6. The cloud computing system of claim 5, wherein intermediate data generated by the first programmable IC device is stored within the memory of the FAM circuitry and accessed by a second function of the functions.

7. The cloud computing system of claim 1, wherein the fabric manager circuitry is further configured to:
 determine that a second function of the functions is not supported by programmable IC devices of the cloud computing system; and
 reconfigure a second programmable IC device of the programmable IC devices to compute the second function based on determining that the second function is not supported.

8. A method comprising:
 determining a task graph, a data graph, and a function popularity heap parameter for an input application, wherein the task graph comprises an indication of function interdependency of functions of the input application, the data graph comprises an indication of data interdependency of the functions, and the function popularity heap parameter corresponds to a re-usability index for the functions; and
 allocating a first programmable integrated circuit (IC) device to perform a first function of the input application based on the task graph, the data graph, and the function popularity heap parameter.

9. The method of claim 8, wherein allocating the first programmable IC device to perform the first function includes:
 determining that the first function is supported by the first programmable IC device based on a function support map.

10. The method of claim 8, wherein allocating the first programmable IC device to perform the first function includes:
 determining a processing resource requirement for the first function; and
 negotiating to allocate the first programmable IC device based on a number of available processing resources being at least as large as the processing resource requirement.

11. The method of claim 8, wherein allocating the first programmable IC device to perform the first function includes:
 determining a processing resource requirement for the first function; and
 de-allocating the first programmable IC device based on a number of available processing resources being less than the processing resource requirement.

12. The method of claim 8 further comprising allocating a starting address within a memory of fabric attached memory (FAM) circuitry for the first function.

13. The method of claim 12, wherein intermediate data generated by the first programmable IC device is stored within the memory of the FAM circuitry and accessed by a second function of the functions.

14. The method of claim 8 further comprising:
 determining that a second function of the functions is not supported by programmable IC devices of a cloud computing system; and
 reconfiguring a second programmable IC device of the programmable IC devices to compute the second function based on determining that the second function is not supported.

15. A cloud computing system comprising:
 fabric manager circuitry configured to allocate a first programmable integrated circuit (IC) device to perform a first function of an input application based on a task graph, a data graph, and a function popularity heap parameter of the input application, wherein the task graph comprises an indication of function interdependency of functions of the input application, the data graph comprises an indication of data interdependency of the functions, and the function popularity heap parameter corresponds to a re-usability index for the functions; and
 fabric attached memory (FAM) circuitry configured to allocate a starting address within a memory of the FAM circuitry for the first function, wherein the first programmable IC device is configured to store data associated with the first function at the starting address.

16. The cloud computing system of claim 15 further comprising cloud orchestrator circuitry configured to receive the input application and determine the task graph, the data graph, and the function popularity heap parameter for the input application.

17. The cloud computing system of claim 15, wherein allocating the first programmable IC device to perform the first function includes:
 determining that the first function is supported by the first programmable IC device based on a function support map.

18. The cloud computing system of claim 15, wherein allocating the first programmable IC device to perform the first function includes:
 determining a processing resource requirement for the first function; and negotiating to allocate the first programmable IC device based on a number of available processing resources being at least as large as the processing resource requirement.

19. The cloud computing system of claim 15, wherein allocating the first programmable IC device to perform the first function includes:
   determining a processing resource requirement for the first function; and
   de-allocating the first programmable IC device based on a number of available processing resources being less than the processing resource requirement.

20. The cloud computing system of claim 15, wherein the fabric manager circuitry is further configured to:
   determine that a second function of the functions is not supported by programmable IC devices of the cloud computing system; and
   reconfigure a second programmable IC device of the programmable IC devices to compute the second function based on determining that the second function is not supported.

* * * * *